CLARK GOODMAN
HUGH B. FREY JR.
INVENTORS.

Sept. 6, 1960     H. B. FREY, JR., ET AL     2,951,946
METHOD AND APPARATUS FOR LOGGING EARTH FORMATIONS
Filed Nov. 9, 1955     2 Sheets-Sheet 2

CLARK GOODMAN
HUGH B. FREY JR.
    *INVENTORS.*

BY *Robert Hockfield*

THEIR ATTORNEY.

United States Patent Office 2,951,946
Patented Sept. 6, 1960

2,951,946

METHOD AND APPARATUS FOR LOGGING EARTH FORMATIONS

Hugh B. Frey, Jr., Southbridge, and Clark Goodman, Boston, Mass., assignors, by mesne assignments, to Schlumberger Well Surveying Corporation, Houston, Tex., a corporation of Texas Filed Nov. 9, 1955, Ser. No. 545,841

6 Claims. (Cl. 250—84.5)

This invention relates to the testing of materials and, more particularly, pertains to novel methods and apparatus for investigating materials through direct interaction with particle energy. Although the present invention is useful in a wide variety of applications, it is ideally suited to the investigation of earth formations traversed by a borehole and, for convenience, will be described in this connection.

Earth formations have been logged heretofore by irradiation with neutrons or gamma rays and obtaining indications of nuclear phenomena resulting from such irradiation. These methods, while achieving wide commercial success, necessarily require the use of a source of radiant energy as well as a detector. The radiation emitted by the source is independent of the formation properties and of the radiation received by the detector. Hence, in such prior logging systems, only indirect methods of investigation may be carried out.

It is an object of the present invention, therefore, to provide novel direct methods and apparatus for investigating material.

Another object of the present invention is to provide novel methods and apparatus for well logging in which formation material enters into direct interaction with a source of radiant energy.

Yet another object of the present invention is to provide a novel source of neutrons featuring a high neutron flux so that higher logging speeds than heretofore possible may be employed.

A further object of the present invention is to provide a novel neutron source for well logging which may be readily activated in a borehole during logging operations and thereafter be de-activated prior to withdrawal so as to reduce possible health hazards to operating personnel at the surface.

In accordance with the present invention, material is investigated by establishing a nuclear chain reaction influenced by a constituent of the material.

According to a particular embodiment of the present invention the reaction is controlled to provide a predetermined operating characteristic therefor and indications are obtained that are dependent upon a radiation product of the reaction. Such indications may be representative of a control effect exerted on the reaction, a resulting nuclear phenomenon in the material under investigation, or a physical parameter in a space occupied by the reaction. The physical parameter may be the temperature developed in a liquid medium in which the reaction takes place or may be the pressure developed in confined gases resulting from vaporization of the liquid medium.

To carry out the foregoing methods in a specific environment, apparatus is contemplated for logging earth formations traversed by a borehole. This apparatus comprises a housing adapted to be passed through the borehole, and a nuclear chain reactor is supported within the housing.

According to a particular aspect of the invention, the reaction is under the influence of a constituent of the earth formations and means are provided for deriving indications of a nuclear phenomenon resulting from irradiation of the formations by neutrons from the reaction. This may be accomplished through the use of a neutron reflector disposed adjacent the reactor and a control member movable along a path adjacent to an exposed portion of the reactor and extending beyond the reflector. The control member may be displaced along the aforesaid path to a position effecting a selected operating characteristic for the reactor, and the apparatus may further comprise means for indicating the position of the control member with respect to a reference position.

The novel features of the present invention are set forth with particularly in the appended claims. The present invention, both as to its organization and manner of operation, together with further objects and advantages thereof, may best be understood by reference to the following description taken in connection with the accompanying drawings in which:

Fig. 1 is a view in longitudinal section schematically illustrating neutron well logging apparatus constructed in accordance with the present invention;

Figs. 2 and 3 are cross-sectional views taken along lines 2—2 and 3—3, respectively, of Fig. 1 and drawn to an enlarged scale;

Figure 1:
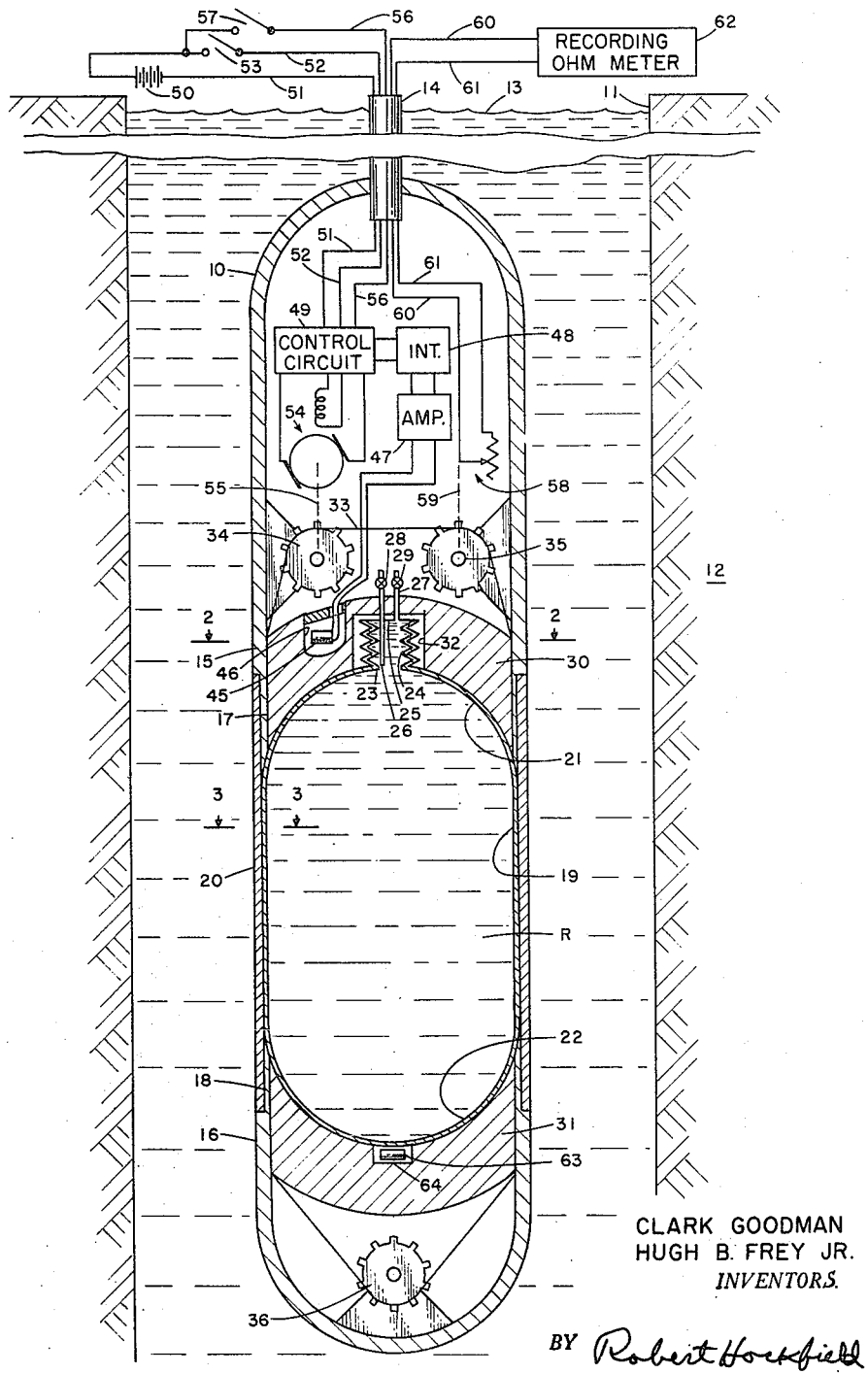

In Fig. 1 of the drawings, the neutron well logging apparatus constructed in accordance with the invention is shown to comprise a pressure-resistant housing 10 disposed in a bore hole 11 traversing a plurality of earth formations 12. The borehole 11 usually contains a hydrogenous drilling fluid 13 such as an oil base or water base mud. Housing 10 is suspended in borehole 11 by an armored cable 14 which may be employed together with a winch (not shown) to lower and raise housing 10 in a customary manner.

Housing 10 is comprised of upper and lower cylindrical sections 15 and 16 of the same diameter. These sections are longitudinally spaced from one another and are provided with similar, shouldered portions 17 and 18 of reduced diameter. The diameter of shoulder portions 17 and 18 is substantially equal to the outer diameter of a container 19 disposed within housing 10. To support container 19 securely and provide a pressure-proof connection between housing sections 15 and 16, a beryllium cylinder 20 having an inner diameter equal to the outer diameter of container 19 is first heated so that it may expand and, after assembly of members 15, 16, 19 and 20, is cooled so that a temperature-shrink fit is effected at shoulder portions 17 and 18 and at container 19. The wall of cylinder 20 is thinner than the walls of housing sections 15 and 16 so that housing 10 exhibits a smooth and uniform exterior surface.

Container 19 is comprised of a relatively thin stainless steel shell including upper and lower, hemispheric end caps 21 and 22. Upper cap 21 has an opening 23 connected to a stainless steel Sylphon bellows 24, and the upper end of bellows 24 is provided with a closure 25. A filling tube 26 extends through closure 25 and a vent tube 27 is connected to the closure. Tubes 26 and 27 are normally closed by control valves 28 and 29, respectively. As will be explained more fully hereinafter, this valve and tube arrangement provides the means for introducing a nuclear chain reacting solution R to container 19.

Solution R, for example, may be composed of uranyl sulfate dissolved in water. The uranyl sulfate may be prepared in a known manner from uranium which is rich in the isotope of atomic weight 235. Preferably the concentration of $U^{235}$ relative to $U^{238}$ is greater than 15%. The water should be of high purity, such as may be attained by conventional distillation techniques. The amount of uranyl sulfate employed is selected so that a ratio of hydrogen to uranium in the neighborhood of 200 is obtained. Thus, for a given volume and surface area of container 19, suitable for borehole use, the solution is normally inactive, but under conditions within borehole 10, a controllable nuclear chain reaction may be established, as will be described more fully hereinafter.

To assist in maintaining a nuclear chain reaction, upper and lower neutron reflectors 30 and 31 are supported within housing 10. The reflectors may, for example, be constructed of beryllium and may be provided with hemispheric concavities so that they may be disposed in close interfitting relationship with hemispheric caps 21 and 22 of container 19. The upper reflector 23 includes a recess 32 for receiving bellows 24 and openings are provided through which tubes 26 and 27 extend.

Reflectors 30 and 31 are of sufficient thickness so that neutrons derived within container 19 and moving longitudinally relative to borehole 11 are reflected to the container or are absorbed. Accordingly, reflectors 30 and 31 define shield portions for the reactor and since cylinder 20 is relatively thin, the remaining portion of the container 19 is unshielded so that neutrons may pass laterally out of the reactor toward the earth formations 12.

Figure 2:
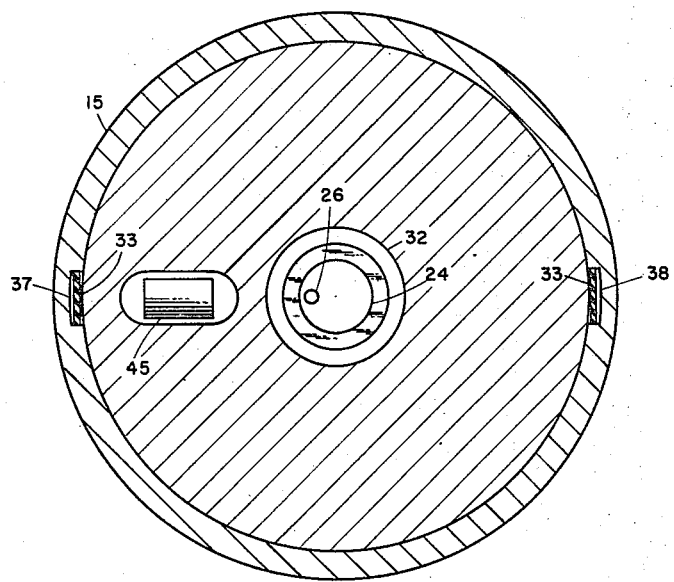
Figure 3:
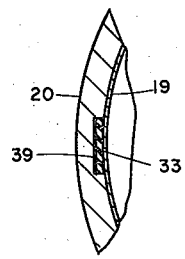

In order to control the reactor, there is provided a control strip 33 in the form of an endless belt or tape having perforations which receive the teeth of a pair of toothed wheels 34 and 35 rotatably supported above reflector 30 and a toothed wheel 36 rotatably supported below reflector 31. As shown in Fig. 2, housing portion 15 has longitudinally extending, opposed recesses 37 and 38 which receive tape 33 and, although not illustrated, housing section 16 is similarly equipped. In addition, as shown in Fig. 3, cylinder 20 has a longitudinally extending recess 39 which is aligned with recess 37 of housing section 15 for receiving tape 33. A similar recess (not shown) in cylinder 20 is aligned with recess 38. Accordingly, tape 33 is movable along a path adjacent the exposed or relatively unshielded portion of the reactor and extending beyond reflectors 30 and 31.

Figure 4:
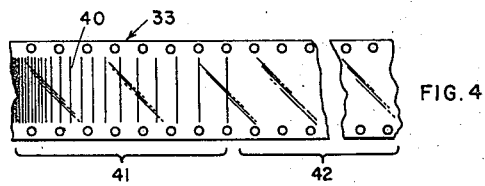
Fig. 4 is a plan view of a portion of the control element included in the apparatus of Fig. 1 drawn to an enlarged scale.

Control tape 33 may be constructed of any neutron-absorbing material coated on a non-absorbing material to a limited extent. For example, a steel tape may be employed on which a layer or coating of cadmium is deposited. Alternatively, as shown in Fig. 4, tape 33 may be a conventional sensitized nitro-cellulose film exposed and fixed in a well-known manner to produce a silver deposit 40 of continuously variable density along a section 41, while a following section 42 is uncoated. Thus, tape 33 may be comprised of a neutron-absorbing or moderating section 41 somewhat longer than container 19 followed by a non-absorbent section 42 of similar length. The tape 33 further comprises an absorbent section 43 (Fig. 5) disposed opposite to absorbent section 41 but oriented in reverse variable-density relationship and connected to section 41 by a non-absorbent section 44.

To control the reaction within container 19 so as to maintain a given characteristic, such as a constant neutron flux, a feedback means is provided that includes a neutron detector 45 (Fig. 1) which may be a conventional cadmium-shielded Geiger tube or proportional counter is supported within a closed recess 46 in the upper end of reflector 30. Detector 45 is electrically coupled to a conventional amplifier 47, in turn, coupled to an integrator 48 wherein a potential is developed representing the neutron flux incident on the detector. This potential is applied to a conventional control circuit 49 connected to one terminal of a power source, such as a battery 50, at the surface of the earth by an electrically insulated conductor 51 of cable 14, and connected by another cable conductor 52 and an operating switch 53 to the remaining terminal of the battery. With switch 53 closed, electrical energy is supplied directly to a driving motor 54 which is mechanically connected by a coupling, schematically illustrated as a dashed line 55, to toothed wheel 34.

Another energization circuit is completed to circuit 49 by a cable conductor 56 and an operating switch 57. When switch 57 is closed, control circuit 49 responds to the potential from source 50 to control motor 54 whereby tape 33 is displaced in such a manner to maintain the neutron output of the reactor at a selected reference level.

In order to derive a record of the position of control tape 33, a variable resistor 58 is mechanically coupled by appropriate means, schematically illustrated by dashed line 59, to toothed wheel 35. The resistor is electrically connected by cable conductors 60 and 61 to a conventional recording ohmmeter 62 at the surface of the earth. The recording medium in meter 62 may be displaced in proportion to the movement of housing 10 through the borehole 11, thereby to obtain a continuous log as a function of depth in the borehole. Such a log depicts the position of control tape 33, with respect to a reference position, at which a selected operating characteristic is effected for the reaction within material R.

Although the reactor just described may start itself because of the spontaneous fission in Uranium-238 and the small density of neutrons in boreholes under ordinary conditions, it may be desirable to insure the reactor from making too large fluctuations in neutron flux. Accordingly, a small neutron source 63 may be located near the reactor core. For example, source 63 may be disposed in a recess 64 in the upper surface of lower reflector 31. Source 63 may be of conventional composition providing a neutron strength of approximately ten millicuries. For example, a mixture of radium and beryllium or of polonium and beryllium may be used.

Figures 5, 6:
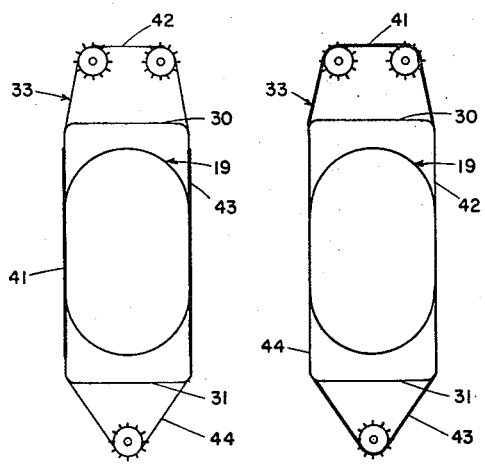
Figs. 5 and 6 are simplified schematic representations of the apparatus of Fig. 1 and illustrate respective operating conditions which may be attained in the apparatus.

To condition the logging apparatus just described prior to insertion in borehole 11, switch 53 is closed to energize motor 54 for an interval sufficient to carry tape 33 to the position illustrated in Fig. 5. This is the condition in which maximum neutron absorption occurs and a continuous nuclear chain reaction is inhibited. Valves 28 and 29 are then opened and a uranyl sulfate-water solution is introduced to container 19 via filling tube 26, residual gases or air being permitted to vent through outlet tube 27. An amount of filling liquid is utilized so that the liquid level is below bellows 24 so as to provide a space for the collection of gases. Finally valves 28 and 29 may be closed and housing 10 may be lowered in borehole 11.

After a depth is reached at which adequate shielding is afforded by the formations and the drilling mud to protect operating personnel, switch 57 is closed thereby to place motor 54 under the influence of the signal supplied to control circuit 49 by integrator 48. Since the control tape 33 was left at the position illustrated in Fig. 5, the reactor provides no neutron output.

Sufficient volume of the uranyl sulfate solution R is contained in the reactor vessel 19 to produce appreciable neutron multiplication but not quite sufficient to maintain a chain reaction in the absence of surrounding formations 12 and drill-hole fluid 13. In other words, despite the presence of reflectors 30 and 31, the effective reproduction factor $k_{eff}$ of the reactor is slightly less than 1.000 without the neutron reflection effects of the formations and the fluid. Moreover, even the presence of any amount of neutron-reflecting material adjacent the portion of container 19 intermediate ends 21 and 22 does not support a nuclear chain reaction because sections 41 and 43 of tape 33 absorbs a sufficient quantity of neutrons to maintain the reactor in a sub-critical condition. Under these conditions, which exist when the reactor is outside the borehole, the natural neutron flux from source 63 and from spontaneous fission of $U^{238}$ and cosmic radiation will only be increased by a factor of between 2 to 10 by the fission of $U^{235}$.

It is thus seen that there is no neutron flux incident on detector 45 and the output of integrator 48 is correspondingly low. Consequently, motor 54 is energized and it drives control tape 33 toward the position shown in Fig. 6 at which minimum neutron absorption occurs. As fewer neutrons are absorbed, more of the neutrons emanating from material R may be reflected back by certain elements in the drilling mud 13 and in the formations 12. In particular, hydrogen in these places causes reflections and at some position of control tape 33, criticality is obtained in the fission of uranium.

Stated more specifically, when the reactor is lowered into the borehole, neutrons, which on the surface were able to leak out radially, are now reflected back into the reactor by the surrounding fluid 13 and formations 12. Under these conditions a self-sustaining reaction becomes possible, that is the $k_{\text{eff}}$ of the reactor plus its surroundings becomes slightly greater than 1.000. In consequence, the neutron flux rises to whatever level is desired. Thus, a continuous chain reaction ensues in which a relatively intense neutron flux emanates from material R.

The feedback means employed to maintain a given neutron flux level operates as follows: As the neutron flux increases, the pulse rate of the signal from detector 45 increases and the potential developed by integrator 48 increases, whereupon tape 33 is driven in the opposite direction. Thus, through the agency of control circuit 49, the potential supplied to motor 54 is adjusted to bring tape 33 to a position at which $k_{\text{eff}}$ of the reactor is maintained at 1.000 exactly at the desired neutron flux.

In the foregoing it is understood that the fission of $U^{236}$ caused by the absorption of neutrons by $U^{235}$ results on the average in the production of 2.5 million electron volt (mev.), fast neutrons. The maintaining of the chain reaction requires that on the average at least one of these fission neutrons, after slowing down in the reactor end reflectors, fluid or formation, must cause a new fission in $U^{235}$ in order to have the reaction be self-sustaining.

As the housing 10 traverses borehole 11, differing amounts of hydrogenous material in the formations 12 result in varying positions of control tape 33 at which the given neutron output is obtained. Of course, the resistance value of resistor 58 is correspondingly changed and recorder 62 provides a continuous log of the reflectivity of the material in formation 12 for neutrons. Such a log may be termed an "albedo log."

Albedo, $\gamma$, has been defined heretofore as the ratio of the number of neutrons $j_{\text{out}}dS$ which cross the surface element per unit time in a direction from B to A (formation=B and drill-hole=A) to the number $j_{\text{in}}dS$ crossing per unit time in a direction from A to B. Thus $$\gamma = \frac{j_{\text{out}}}{j_{\text{in}}} = 1 - \frac{4}{3} \frac{l}{\lambda + \frac{2}{3}l}$$

where $l$=transport means-free-path of formation and $\lambda$= linear extrapolation length of neutron flux density into the formation.

In essence, therefore, the albedo log gives a measure of the transport mean-free-path of the formation for low energy neutrons. While the transport mean-free-path is proportional to the elastic scattering mean-free-path, the two parameters are sufficiently different that albedo logs should provide valuable data even though the same well has been logged by conventional $(n,\gamma)$ or $(n,n)$ methods.

After a log is completed, switch 57 may be opened and switch 53 closed so that motor 54 may be energized to bring control tape to the position shown in Fig. 5. The nuclear chain reaction may thus be interrupted and the housing 10 can be withdrawn from the borehole with a minimum of danger from neutron production.

It is thus evident that the unique methods and apparatus for investigating material in accordance with the invention features a source and detector in one inherent integral unit. In other words, the reactivity of the reactor, which determines the behavior of the source, depends directly on the neutron reflectivity of the material in contrast to prior indirect methods.

Moreover, the behavior of the reactor depends upon the multiplication properties of the material under investigation. For example, if the formations contain uranium, the multiplication properties of the $U(n,f)$ reaction will be indicated in the derived log. Also, beryllium may be depicted as a result of fast neutron leakage at energies above five million electron volts producing the $B_e(n,2n)$ reaction or as a result of the reaction $B_e(\gamma,n)$. It will also be appreciated that multiplication occurs in the deuterium reaction $D(\gamma,n)$.

While the ratio of hydrogen to uranium (H/U) in the borehole reactor may take a variety of values, depending on various design considerations, a value of H/U of 200 may be employed. At this value the critical mass for a cylindrical core 15 cm. in diameter by 15 cm. in length capped by a hemispherical section at each end would be about 1500 grams of $U^{235}$, assuming a surrounding reflector of good nuclear characteristics. By loading this core with 2000 grams of $U^{235}$ and providing control mechanisms as described above, the reactor could be maintained critical under most drill-hole conditions.

This so-called "critical condition" may correspond to a power production of 1 microwatt or 1 megawatt, depending on how much the neutron flux has been allowed to grow before $k_{\text{eff}}$ is re-established at 1. The adjustment of $k_{\text{eff}}$ is accomplished by the movement of control tape 33.

If desired, compensation for the effect of temperature in the borehole may be provided. Generally an increase in temperature results in a decrease in reactivity. Hence, an appropriate temperature-sensitive control system (not shown) may be incorporated in the apparatus of Fig. 1 so that tape 33 is automatically adjusted to compensate for temperature changes either due to ambient temperature in the borehole or from heat generated by fission in the reactor.

It will be noted that the neutron output of the borehole reactor embodying the present invention is primarily at low energies. This may be useful, for example, in induced radioactivity logging. In addition, there is at least a 1% high energy tail to the fission spectrum which will escape from the drill-hole reactor and enter the formations. Assuming this percentage, the power level can be estimated for drill-hole operation that will give the following neutron yields which may be compared to the known yields from Ra—Be and D—T sources:

| Reactor Power, Watts | Approximate Neutron Source Strength | |
|---|---|---|
| | Thermals | Fasts |
| 0.1 | $3 \times 10^9$ | $3 \times 10^7$ |
| 1 | $3 \times 10^{10}$ | $3 \times 10^8$ |
| 10 | $3 \times 10^{11}$ | $3 \times 10^9$ |
| 100 | $3 \times 10^{12}$ | $3 \times 10^{10}$ |

These rough estimates are based on $3 \times 10^{10}$ fissions per watt, 1 thermal neutron leaking and 0.01 fast neutron leaking into the formation per fission.

From the foregoing it may be seen that good neutron output, similar to those from conventional Ra—Be and D—T sources, can be achieved at relatively low power levels (0.1 to 1 watt). At higher powers (10 to 100 watts) substantially larger neutron intensities can be obtained. Since the body of container 19 is in direct contact with housing 10, heat is continuously dissipated to the borehole liquid 13 after the reactor temperature rises above the ambient temperature in the borehole.

Figure 7:
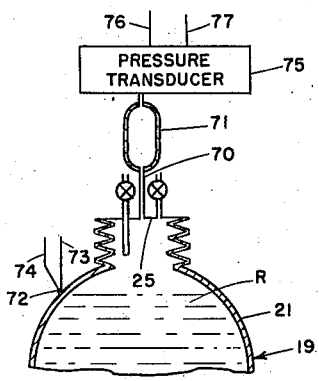
Fig. 7 represents a modification which may be made to the apparatus of Fig. 1 featuring another embodiment of the invention.

Temperature control may also be achieved by permitting the liquid R to increase to the boiling point and refluxing the liquid. For example, as shown in Fig. 7 an opening in closure 25 may be connected by a tube 70 to an expansion chamber 71. Control circuit 49 is arranged so that equilibrium is reached at a power where solution R boils. The water vapor from container 19 passes through tube 70 and enters expansion chamber 71 where it condenses and returns to container 19. It is evident that when the power in the reactor increases, a greater amount of vaporization occurs, thereby reducing the amount of water in container 19 and the rate of reaction is reduced. Accordingly, the reactor power is automatically controlled. Preferably, chamber 71 dissipates heat to borehole liquid 13.

If desired, a thermocouple 72 may be arranged to measure the temperature of container 19 and is connected by leads 73 and 74 to a suitable temperature recorder (not shown). Thus, the temperature may be logged. Alternatively, chamber 71 may be fluidly connected to a conventional pressure transducer 75 connected by leads 76 and 77 to an appropriate recorder (not shown) and the pressure in the reactor may be logged. In either case, the pressure or temperature at which equilibrium occurs in the reactor is indicative of the neutron reflective characteristics of the earth formations under investigation and such data can be suitably recorded as a function of depth.

In order to reduce the size of the borehole reactor, materials having a larger fission cross-section may be employed. For example, $Pu^{239}$, $U^{233}$ or other fissionable isotopes can be employed in appropriate compounds soluble in water.

In addition to the foregoing uses, the borehole reactor embodying the present invention can be employed in conjunction with gamma ray and neutron detectors above or below container 19 to make $(n,\gamma)$, $(n,n)$, $n$, induced activity) and $(\gamma,\gamma)$ logs. However, because of the nature of the source, the locus of the secondary radiation production will be different than with prior sources.

The neutron leakage flux from the reactor contains a few percent of fast neutrons (2 to 10 mev.) which will produce secondaries, i.e., gammas from inelastic scattering and from capture in the formations. However, the major part of the flux incident on the formation will be slow or thermal neutrons. Such neutrons are absorbed in only a few centimeters of rock containing elements with large capture cross-sections, for example, in shale. On the other hand, the depth of penetration may be an order of magnitude ($\times 10$) greater in rocks of low absorption, for example, a pure limestone. Hence, the secondary radiation, either from capture gammas or gammas from induced radioactivity, will originate at a distance from the wall of the drill-hole which depends primarily on the slow neutron absorption properties of the formation. This is in marked contrast to that for fast neutron sources in which the depth of penetration is largely dependent on the slowing down length of the formation, rather than on the thermal diffusion length.

The neutron flux reflected back into the drill-hole by the formations will be essentially a slow or thermal neutron flux. This is not very different from the type of flux obtained in $(n,n)$ logging using conventional sources. However, the depth of origin of this flux depends on the diffusion length of the formation rather than on the slowing down length which largely determines the depth of penetration in $(n,n)$ logging using fast neutron sources.

The gamma ray leakage from the reactor is largely in the energy range from 0.5 to 2 mev. This is also the energy range for portable gamma sources ($Co^{60}$, Ra, Sb, etc.) used in conventional $(\gamma,\gamma)$ logging. Thus the drill-hole reactor will give $(\gamma,\gamma)$ logs similar to the previous type which were usually density logs. The major difference is that the reactor source can be substantially reduced in intensity by shutting off the chain reaction upon removal from the drill-hole. The reason the gamma intensity does not drop to zero is that the fission products generated remain fairly radioactive over considerable periods of time, days to years.

In connection with $(n,n)$, $(n,\gamma)$ or $(\gamma,\gamma)$ logging using a nuclear chain reactor in accordance with the present invention, it will be noted that extremely high radiation fluxes can be obtained. Thus, much faster logging speeds than heretofore employed are possible.

If desired, monitor 45 may be positioned adjacent the material under investigation. For example, it may be supported in a pad adapted to engage the sidewall of borehole 11. In this way, the flux of slow neutrons passing into the formations may be maintained at a constant value.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

We claim:

1. A method of logging earth formations traversed by a borehole which comprises the steps of lowering a housing containing a solution capable of nuclear chain reacting into said borehole, the power level of the reaction of said solution being under the influence of the earth formations, controlling said reaction to maintain a predetermined power level by controlling the position of a neutron absorber relative to the position of said solution, and measuring the position of said absorber necessary to maintain said power level.

2. Apparatus for logging earth formations traversed by a borehole comprising a housing adapted to be passed through the borehole, a controllable neutron-producing nuclear chain reactor supported within said housing, a neutron reflector disposed adjacent a portion of said reactor to define a shielded portion and an exposed portion thereof, a control member including a neutron absorbing material movable along a path adjacent to said exposed portion of said reactor and extending beyond said reflector and means to indicate the position of said control member in order to measure the amount of influence the earth formations have on said reactor.

3. Apparatus for logging earth formations traversed by a borehole comprising a housing adapted to be passed through the borehole, a controllable neutron-producing nuclear chain reactor supported within said housing, a neutron reflector having opposite side portions disposed with one of said side portions adjacent said reactor to define a shielded portion and an exposed portion thereof, a control member movable along a path having one section adjacent said exposed portion of said reactor and another section adjacent the remaining side portion of said reflector, said control member having variable amounts of a neutron absorbing material deposited thereon, means for displacing said control member along said path to vary the amount of said neutron absorbing material which is adjacent said exposed portion of said reactor in order to maintain a selected operating characteristic for said reactor, and means for indicating the position of said control member with respect to a reference position.

4. An apparatus for logging the earth formations traversed by a borehole comprising a housing adapted to be lowered into said borehole, a solution which is capable of sustaining a nuclear chain reaction contained within said housing, neutron reflecting means disposed adjacent said solution so as to form shielded portions and unshielded portions of said solution, neutron absorbing means movably mounted in path defining means, said path extending adjacent said unshielded portions of said solution, feedback means for controlling the position of said neutron absorbing means relative to said unshielded portions in response to a change in the power output level of said solution, and means for indicating the position of said neutron absorbing means with respect to said unshielded portions.

5. An apparatus for logging the earth formations traversed by a borehole comprising a housing adapted to be lowered into said borehole, a solution which is capable of nuclear chain reacting contained within said housing, neutron shielding means substantially surrounding said solution in such a manner as to define shielded portions and unshielded portions of said solution, control means having varying amounts of a neutron absorbing material deposited thereon, said control means being movably mounted in path defining means adjacent said unshielded portions, feedback means which is responsive to the power output level of said solution for adjusting the position of said control means relative to said unshielded portion of said solution, and a measuring means for indicating the position of said control means.

6. An apparatus for logging the earth formations traversed by a borehole comprising a housing adapted to be lowered into said borehole, a solution which is capable of sustaining a nuclear chain reaction contained within said housing, neutron reflecting means substantially surrounding said solution so as to form shielded portions and unshielded portions of said solution, control means movable along a path adjacent said unshielded portions, said control means having deposited thereon varying amounts of a neutron absorbing material, feedback means for varying the position of said control means along said path, neutron sensitive means positioned adjacent said solution for feeding a signal into said feedback means which is indicative of the neutron flux level in said solution, said feedback means being adapted to maintain the neutron flux level of said solution at a substantially constant level, and an indicating means coupled to said control means for indicating the position of said control means relative to said unshielded portions.

References Cited in the file of this patent
UNITED STATES PATENTS

| | | |
|---|---|---|
| 2,583,976 | Thayer | Jan. 29, 1952 |
| 2,708,656 | Fermi et al. | May 17, 1955 |
| 2,719,823 | Zinn | Oct. 4, 1955 |
| 2,737,595 | Scherbatskoy | Mar. 5, 1956 |